United States Patent
Jardel et al.

(10) Patent No.: US 10,785,085 B2
(45) Date of Patent: Sep. 22, 2020

(54) PROBABILISTIC SHAPING FOR PHYSICAL LAYER DESIGN

(71) Applicant: NOKIA TECHNOLOGIES OY, Espoo (FI)

(72) Inventors: Fanny Jardel, Arpajon (FR); Jie Chen, Naperville, IL (US); Philippe Sehier, Saint Germain en Laye (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/248,234

(22) Filed: Jan. 15, 2019

(65) Prior Publication Data
US 2020/0228386 A1     Jul. 16, 2020

(51) Int. Cl.
H04L 27/36 (2006.01)
H04L 27/34 (2006.01)
H04L 1/00 (2006.01)

(52) U.S. Cl.
CPC ........ H04L 27/362 (2013.01); H04L 27/3411 (2013.01)

(58) Field of Classification Search
CPC ............... H04L 27/362; H04L 27/3411; H04L 27/3433; H04L 25/067; H04L 25/49; H04L 25/03828–03859; H04L 1/0041; H04L 1/0042; H04L 1/005; H04L 1/0057; H04B 10/0779; H04B 10/5161; H04B 10/541; H04J 14/0205; H04J 14/0226
See application file for complete search history.

(56) References Cited

U.S. PATENT DOCUMENTS

| | | | | |
|---|---|---|---|---|
| 7,054,639 B2* | 5/2006 | Lin | ........... | H04B 7/063 375/299 |
| 7,340,009 B2* | 3/2008 | Giannakis | .......... | H04B 1/71632 375/267 |
| 7,738,925 B2* | 6/2010 | Nguyen | ................ | H01Q 1/246 455/25 |
| 8,335,474 B2* | 12/2012 | Huttunen | .............. | H04L 5/0062 375/343 |

(Continued)

FOREIGN PATENT DOCUMENTS

| | | |
|---|---|---|
| WO | 2010/131125 A1 | 11/2010 |
| WO | 2018/077443 A1 | 5/2018 |
| WO | 2018/133939 A1 | 7/2018 |

OTHER PUBLICATIONS

F. Buchali, W. Idler, L. Schmalen, K. Schuh, and H. Bülow, "Performance and Advantages of 100 Gb/s QPSK/8QAM Hybrid Modulation Formats," Optical Fiber Communications Conference (OFC), Los Angeles, CA, USA, Paper Th2A.16, Mar. 2015.

(Continued)

*Primary Examiner* — James M Perez
(74) *Attorney, Agent, or Firm* — Squire Patton Boggs (US) LLP

(57) ABSTRACT

Systems, methods, apparatuses, and computer program products for probabilistic amplitude shaping (PAS) are provided. One method may include selecting a distribution parameter for one constellation in a communications system depending on one or more flat fading channels, transforming a uniform distribution of the constellation into a shaped distribution using the selected distribution parameter to produce modulated data, and passing the modulated data through a fading channel.

18 Claims, 3 Drawing Sheets

(56) References Cited

U.S. PATENT DOCUMENTS

| | | | | |
|---|---|---|---|---|
| 8,774,322 | B2* | 7/2014 | Goldfarb | H04B 10/6165 375/226 |
| 9,673,907 | B1* | 6/2017 | Vassilieva | H04B 10/5161 |
| 10,069,519 | B1* | 9/2018 | Millar | H03M 13/05 |
| 10,200,231 | B1* | 2/2019 | Lefevre | H04L 27/2628 |
| 10,230,558 | B2* | 3/2019 | Terry | H04L 27/2621 |
| 10,461,972 | B2* | 10/2019 | Yu | H04B 10/5161 |
| 10,511,388 | B1* | 12/2019 | Vassilieva | H04B 10/532 |
| 10,516,503 | B1* | 12/2019 | Millar | G06N 7/005 |
| 10,541,711 | B1* | 1/2020 | Millar | H04L 1/0041 |
| 10,601,517 | B1* | 3/2020 | Kim | H03M 13/6522 |
| 2004/0147234 | A1* | 7/2004 | Lin | H04B 7/0634 455/101 |
| 2006/0008021 | A1* | 1/2006 | Bonnet | H04L 1/0618 375/267 |
| 2007/0283210 | A1* | 12/2007 | Prasad | H04L 1/0637 714/755 |
| 2009/0110033 | A1* | 4/2009 | Shattil | H04J 14/0298 375/141 |
| 2009/0197550 | A1* | 8/2009 | Huttunen | H04L 5/0062 455/161.1 |
| 2011/0176628 | A1* | 7/2011 | Rao | H04B 7/0671 375/267 |
| 2012/0224863 | A1* | 9/2012 | Winzer | G02B 6/14 398/158 |
| 2013/0215996 | A1* | 8/2013 | Boutros | H03M 13/258 375/295 |
| 2014/0316775 | A1* | 10/2014 | Furuta | G10L 21/0208 704/226 |
| 2016/0128072 | A1* | 5/2016 | Rajagopal | H04L 5/001 370/329 |
| 2017/0026095 | A1* | 1/2017 | Ashrafi | H04B 7/0456 |
| 2018/0109284 | A1* | 4/2018 | Hadani | H04L 1/0071 |
| 2018/0205481 | A1* | 7/2018 | Shlomo | H04L 23/02 |
| 2018/0367246 | A1* | 12/2018 | Kakande | H04L 1/0042 |
| 2019/0007255 | A1* | 1/2019 | Limberg | H04L 27/38 |
| 2019/0052509 | A1* | 2/2019 | Krishnan | H04L 1/0042 |
| 2019/0097747 | A1* | 3/2019 | Kim | H04J 14/0257 |
| 2019/0109752 | A1* | 4/2019 | Zhang | H04L 27/345 |
| 2019/0132164 | A1* | 5/2019 | Yu | H04L 27/01 |
| 2019/0149390 | A1* | 5/2019 | Torbatian | H04L 25/49 375/298 |
| 2019/0158238 | A1* | 5/2019 | Lefevre | H04J 1/16 |
| 2019/0199572 | A1* | 6/2019 | Limberg | H04L 1/0063 |
| 2019/0215077 | A1* | 7/2019 | Chien | H04L 25/03834 |
| 2019/0245651 | A1* | 8/2019 | Yuan | H04L 1/0042 |
| 2019/0280809 | A1* | 9/2019 | Cho | H04L 1/0071 |
| 2019/0327124 | A1* | 10/2019 | Lai | H04L 25/0204 |
| 2019/0334755 | A1* | 10/2019 | Limberg | H04B 1/0475 |
| 2019/0342031 | A1* | 11/2019 | Bocherer | H03M 7/40 |
| 2019/0342138 | A1* | 11/2019 | Bocherer | H04L 27/3405 |
| 2020/0036475 | A1* | 1/2020 | Oveis Gharan | H04L 1/0042 |

OTHER PUBLICATIONS

F. Buchali, L. Schmalen, K. Schuh and W. Idler, „ Optimization of Time-Division Hybrid-Modulation and its Application to Rate Adaptive 200Gb Transmission, European Conference on Optical Communications (ECOC), Cannes, France, Paper Tu.4.3.1, Sep. 2014.

Böcherer, G.; Steiner, F.; Schulte, P.: "Bandwidth Efficient and Rate-Matched Low-Density Parity-Check Coded Modulation". IEEE Trans. Commun., Oct. 2015.

Schulte, P.; Böcherer, G.: Constant Composition Distribution Matching. IEEE Trans. Inf. Theory, Dec. 2015.

Prinz, T. et al., "Polar Coded Probabilistic Amplitude Shaping for Short Packets". Institute for Communications Engineering, Technical University of Munich. 2017.

Tobias Prinz, "Polar Codes for Probabilistic Amplitude Shaping," Second LNT & DLR Summer Workshop on Coding, TUM (Technische Universitat Munchen), Institute for Communications Engineering, Jul. 26, 2016.

International Search Report and Written Opinion issued in corresponding International Patent Application No. PCT/FI2020/050004, dated Apr. 24, 2020.

Xi Chen et al., "Uniform Entropy Loading for Precoded DMT Systems in Fading Optical Channel", 2018 Asia Communications and Photonics Conference (ACP), Hangzhou, China, Oct. 26-29, 2019.

* cited by examiner

PROBABILISTIC SHAPING FOR PHYSICAL LAYER DESIGN

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for probabilistic amplitude shaping (PAS) in the context of such communications systems, such as 5G.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment is directed to an apparatus that may include at least one processor and at least one memory comprising computer program code. The at least one memory and computer program code configured, with the at least one processor, to cause the apparatus at least to select a distribution parameter of one constellation in a communications system depending on one or more flat fading channels, transform a uniform distribution of the constellation into a shaped distribution using the selected distribution parameter to produce modulated data, and pass the modulated data through a fading channel.

Another embodiment is directed to a method that may include selecting a distribution parameter of one constellation in a communications system depending on one or more flat fading channels, transforming a uniform distribution of the constellation into a shaped distribution using the selected distribution parameter to produce modulated data, and passing the modulated data through a fading channel.

Another embodiment is directed to a non-transitory computer readable medium comprising program instructions stored thereon for performing a process. The process may include selecting a distribution parameter of one constellation in a communications system depending on one or more flat fading channels, transforming a uniform distribution of the constellation into a shaped distribution using the selected distribution parameter to produce modulated data, and passing the modulated data through a fading channel.

Another embodiment is directed to an apparatus that may include means for selecting a distribution parameter of one constellation in a communications system depending on one or more flat fading channels, means for transforming a uniform distribution of the constellation into a shaped distribution using the selected distribution parameter to produce modulated data, and means for passing the modulated data through a fading channel.

BRIEF DESCRIPTION OF THE DRAWINGS

For proper understanding of example embodiments, reference should be made to the accompanying drawings, wherein.

DETAILED DESCRIPTION

Figure 1:
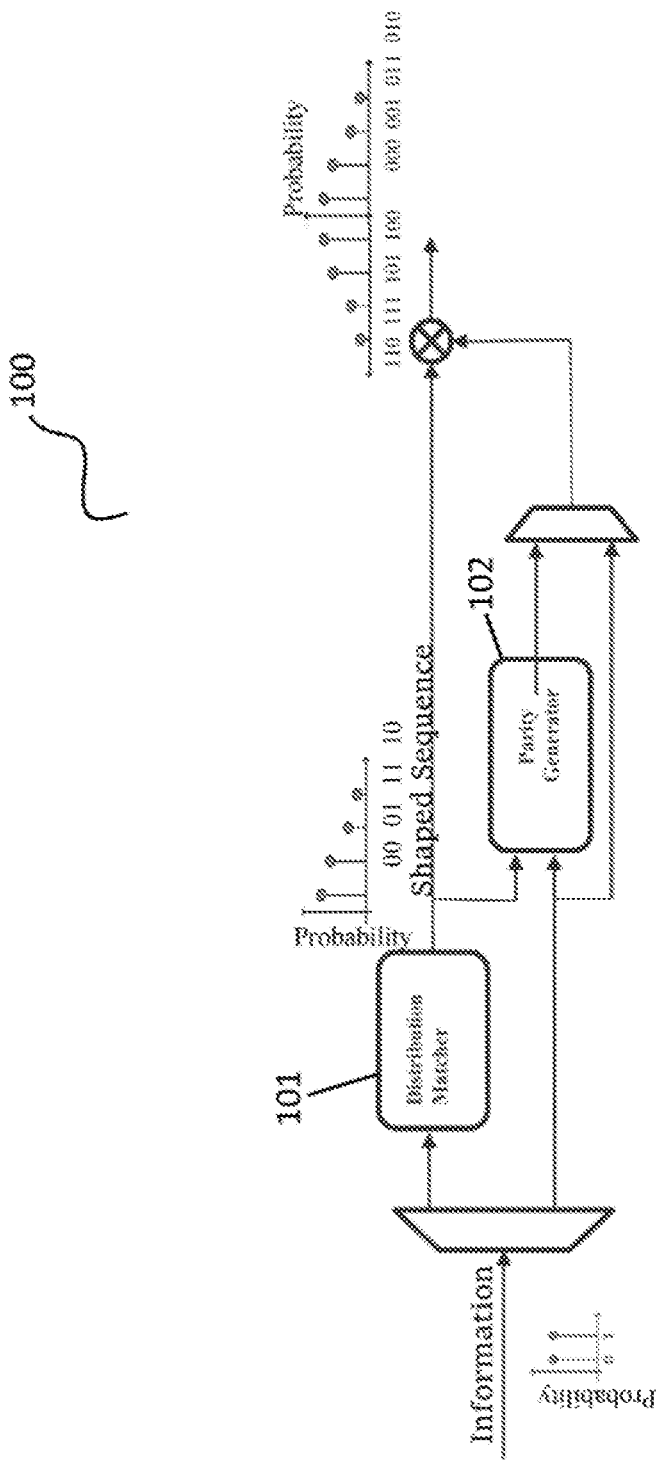
FIG. 1 illustrates an example of probabilistic amplitude shaping (PAS), according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for probabilistic amplitude shaping (PAS) for physical layer design, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Probabilistic amplitude shaping (PAS) has been introduced in the context of versatile and flexible optical networks. PAS is based on a non-uniform probability distribution of modulation symbols. With PAS, spherical shaping of a modulation is possible and the net information rates can be optimized as close to the theoretical limits (e.g., Shannon limits) as possible. Example embodiments apply a PAS coding system to narrowband communication, for example, in the context of 5G, using a spherically-shaped probability distribution.

Capacity-approaching performance can be attained by a coded modulation if two conditions are satisfied. First, the error-correcting code and the modulation should show a large coding gain. Here, the coding gain refers to resilience to additive noise. The coded modulation codewords should be well separated in the Euclidean space in order to avoid errors due to additive noise. Secondly, the modulation exhibits a cost per bit, known as the average energy per bit Eb. The modulation in the Euclidean space should be as spherical as possible to minimize the energy cost Eb.

Coding structures such as low-density parity-check codes (LDPC), polar codes, and turbo codes are examples of error-correcting codes with excellent coding gains. Hence, the condition of a large coding gain can be easily satisfied by one or more of these coding structures. However, the spherical shaping of a modulation was still an open problem until the recent discovery of PAS. As mentioned above, PAS has been introduced in the context of versatile and flexible optical networks where the net information rates are optimized and as close to the theoretical limits as possible.

Two options were available for shaping, in which the modulation is directly built with a geometrical spherical shape (non-uniform constellation) or the modulation symbols are given a spherically-shaped probability distribution (non-uniform probability distribution). The second method appears to be easier for practical implementations. The modulation symbols are made non-equi-probable with a distribution that mimics a discrete Gaussian distribution. This shaping method based on a non-uniform probability distribution of modulation symbols is called PAS. The discrete Gaussian-like distribution to be achieved or approached by the modulation symbols, called Maxwell-Boltzmann (MB) distribution, is given by probability masses that are proportional to exp(−v*|s|^2), where s is a symbol and v is an MB-distribution parameter. The MB distribution applies only on the symbol amplitude due to the |s| in its expression; this explains the word Amplitude in the PAS abbreviation. The symbol sign is left to be free, i.e. +1 and −1 are equi-probable for a given amplitude.

Certain embodiments provide a PAS coding system that can be applied to narrowband communication (e.g., flat fading channels within each OFDM sub-carriers), for example, in the context of the needs of a 3GPP system, such as 5G.

Some example embodiments build a practical coding scheme for modulations to achieve the best possible performance on a digital transmission channel A common measure for the quality of the digital transmission is the bit error probability $P_{eb}$ as a function of the signal-to-noise ratio (SNR). For a given transmission rate R expressed in bits per channel use (bpcu) or in bits per real dimension, the SNR should be large enough to let the system guarantee a vanishing error probability, e.g., $P_{eb}=10^{-6}$. Information theory established limits (Shannon limits) that cannot be exceeded by the rate R and the signal-to-noise ratio SNR. According to Information theory, the highest achievable information rate in presence of additive white Gaussian noise, referred to as channel capacity, is C=1/2 log 2(1+SNR) bpcu. At fixed SNR, it should be R<C to let $P_{eb}$ go to zero. At fixed rate R=C, it should be SNR>($2^{2R}$−1) for a vanishing $P_{eb}$. Thus, the capacity formula gives a maximal achievable rate or equivalently a minimal achievable SNR. An embodiment aims to build a coding scheme such that the transmission system achieves a SNR and a transmission rate as close as possible to Shannon limits, i.e., a capacity-approaching system.

In the context of LTE and 5G communications, the net information rates should be optimized and as close to the theoretical limits as possible. For now, in 5G standards, the same constellation mapping as used in LTE, i.e., Quadrature Phase Shift Keying (QPSK), 16 quadrature amplitude modulation (QAM), 64QAM and 256QAM, is introduced. Those constellations offer a limited level of flexibility to be adapted to different fading channels. However, according to certain embodiments, probabilistic shaping can be used to overcome this problem by offering a very fine-granularity to adapt one constellation, e.g., 256 QAM, to any given fading.

In order to reach the theoretical limits, it is recognized that some sort of constellation shaping to approach the Shannon limit is needed. An attractive solution to achieve this limit is the PAS introduced above. FIG. 1 illustrates an example block diagram of a PAS system 100, according to one example. As depicted in FIG. 1, one component of the system 100 is the distribution matcher (DM) 101. The system 100 takes $U_1$ uniformly distributed input bits and generates $V_1$ symbols belonging to the set A:={$A_1$, $A_2$, ... $A_M$}, which is restricted to M:=$2^{m-1}$ and m denotes the number of bits mapped to the final (real-valued) constellation. The DM 101 imposes a probability distribution $P_A$ ($A_i$) on the symbols, which can be selected such that the information-theoretic capacity is maximized. The rate of the DM 101 may be defined as:

$$R_{DM} := \frac{U_1}{V_1} \leq H(A) = -\sum_{i=1}^{M} P_A(A_i) \log_2 P_A(A_i).$$

Ideally, the DM 101 yields $R_{DM} \approx H(A)$, where H(A) denotes the entropy of the output distribution. If $R_{DM} < H(A)$, then there is a rate loss leading to performance degradation. As discussed above, for LTE and 5G communications, the same constellation mapping is used, i.e., QPSK, 16QAM, 64QAM and 256QAM. These constellations are optimized to approach the capacity over fading channels, and the level of flexibility offered by this is limited. Therefore, certain embodiments may use probabilistic shaping to overcome this problem by offering a very fine-granularity to adapt one unique constellation, e.g., 256 QAM or 1024 QAM, to approach capacity over any fading channel.

As such, one embodiment may be configured to apply probabilistic amplitude shaping for narrowband communications (e.g., flat fading channels for OFMD sub-carriers). In an embodiment, probabilistic shaping may be used to approach closely the capacity over fading channels. One advantage according to certain embodiments is that a transmitter only needs to consider one constellation, such as, but not limited to, 256 QAM or 1024 QAM. The probabilities of the points of this constellation can be adapted to the fading factor such that example embodiments approach, as close as possible, the Shannon capacity. Accordingly, certain embodiments are able to reach a better granularity than the four constellations already in use in the 3GPP standard. Indeed, in some embodiments, the probabilities of the constellation points can be chosen with an extreme precision to fit a large number of flat fading channels and thus more closely approach the Shannon limit.

Certain embodiments may be described herein in the context of narrowband communications and, more specifically, with flat-fading channels within each OFDM subcarrier. However, it should be noted that example embodiments are not limited to just these contexts.

In certain embodiments, at the transmitter side, only one constellation is considered. According to one example, the one considered constellation may be 256 QAM or 1024 QAM. The probabilities of the constellation points are uniform. Then, in one embodiment, an estimation of the flat fading channel may be performed. According to some embodiments, the flat fading channel can be frequency selective and example embodiments may apply without restrictions. In an embodiment, the transmitter may estimate the channel for each targeted device or UE and, within a device allocation, the channel can be frequency selective. In this case, the transmitter may adapt the modulation coding scheme per subband.

In an embodiment, depending on the estimated fading factor, the MB parameter of the constellation can be chosen. This may be seen as a level of shaping. The probabilities of the QAM points may follow a MB distribution, as is done in the example PAS system 100 illustrated in FIG. 1. According to one embodiment, a MB distribution may be given by probability masses that are proportional to $\exp(-v*|s|^2)$, where s is a QAM symbol and v is an MB-distribution parameter. For example, if there is a strong fading, then the probabilities of the points near to the origin will be high and the probabilities of the outer points will be close to zero; this can be seen as a mimic of a QPSK constellation. Whereas, for example, if the estimated/reported SINR is high, then all points of the constellation are used with almost uniform probability. Therefore, by applying probabilistic shaping, example embodiments are able to mimic a large number of constellations with a given 256 QAM or 1024 QAM. The constellation can be tuned with an impressive precision for many flat-fading channels. The performances can be evaluated in terms of gap to the Shannon capacity.

In an embodiment, once the MB-parameter v has been chosen for the given estimated fading factor, the process may continue according to the example system 100 of FIG. 1. The distribution matcher 101 depicted in FIG. 1 may include a coding process that can transform the uniform distribution into the given shaped distribution depending on the chosen v parameter. Then, a parity generator 102 may apply a uniform parity, which is used as a sign +1 or −1, to create the symmetric part of the shaped constellation. In certain embodiments, the modulated data may be sent through the fading channel and transmitted to a receiver.

At the receiver side, the receiver need only know which MB-parameter has been selected. Then, based on that knowledge, the receiver may process the demodulation.

Figure 2:
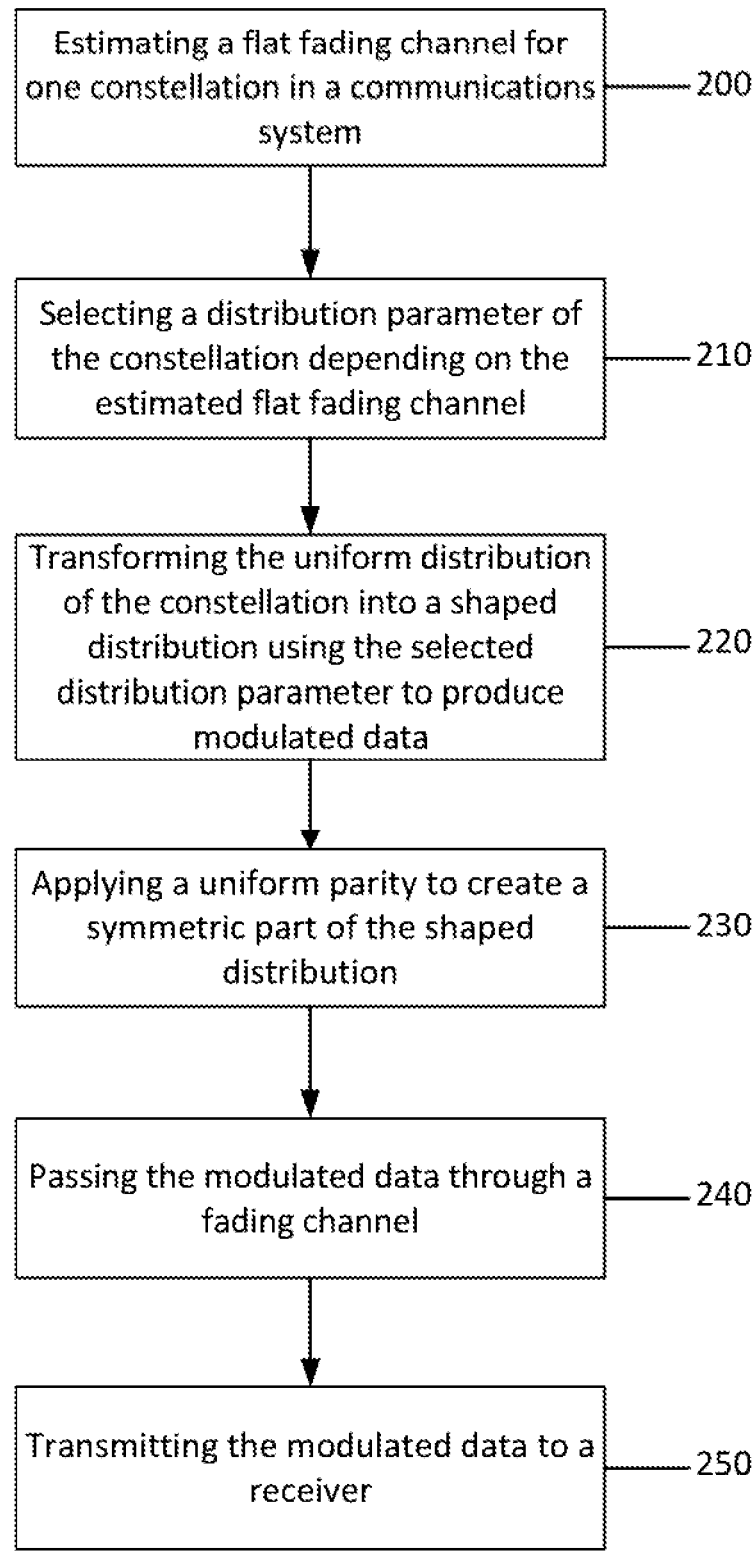
FIG. 2 illustrates an example flow diagram of a method, according to an embodiment.

FIG. 2 illustrates an example flow diagram of a method for probabilistic amplitude shaping in a narrowband communication system, according to one embodiment. In certain example embodiments, the flow diagram of FIG. 2 may be performed by a transmitter, such as a network entity or network node in a 3GPP communications system. In one example, the communications system may be a LTE, 5G or NR system. For instance, in some example embodiments, the method of FIG. 2 may be performed by a base station, eNB, gNB, or the like in a LTE, 5G or NR system.

In one embodiment, the method of FIG. 2 may include, at 200, estimating a flat fading channel for one constellation in a communications system (e.g., 5G system). In one example, the one constellation may be 256QAM or 1024QAM, for instance. In other examples, the one constellation may include QPSK, 16QAM, or 64QAM. The method of FIG. 2 may also include, at 210, selecting a distribution parameter of the constellation depending on one or more flat fading channel(s). When the flat fading channel has been estimated for the constellation, then the selecting 210 may include selecting the distribution parameter for the constellation based on the estimated flat fading channel According to an embodiment, the distribution parameter may include a Maxwell-Boltzmann (MB) distribution parameter. In one example, the MB distribution may be given by probability masses that are proportional to $\exp(-v*|s|^2)$, where s is a QAM symbol and v is the MB distribution parameter. The method may further include, at 220, transforming the uniform distribution of the constellation into a shaped distribution using the selected distribution parameter (e.g., MB distribution parameter) to produce modulated data. In one example, the shaped distribution may include a spherically shaped probability distribution. According to certain embodiments, the method may also include, at 230, applying a uniform parity, such as +1 or −1, to create a symmetric part of the shaped distribution. The method may then include, at 240, passing the modulated data through a fading channel and, at 250, transmitting the modulated data to a receiver.

At the receiver side, the receiver only needs to know which distribution parameter has been selected. Then, based on the distribution parameter information, the receiver is able to process the demodulation.

Figure 3:
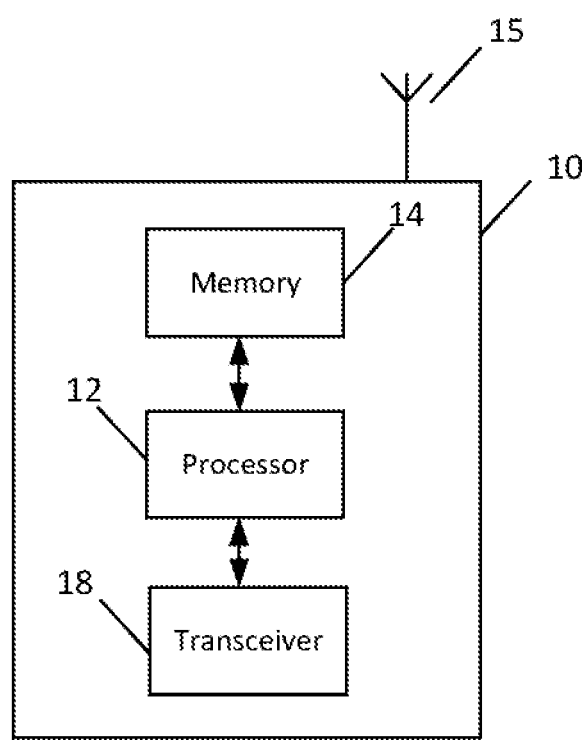
FIG. 3 illustrates an example block diagram of an apparatus, according to an embodiment.

FIG. 3 illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3.

As illustrated in the example of FIG. 3, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow diagram illustrated in FIG. 2. In some embodiments, apparatus 10 may be configured to perform a procedure for probabilistic amplitude shaping in a narrowband communication system, and therefore apparatus 10 may include the PAS system depicted in FIG. 1.

For instance, in one embodiment, apparatus 10 may be controlled by memory 14 and processor 12 to estimate a flat fading channel for one constellation in a communications system (e.g., 5G system). In one example, the one constellation may be 256QAM or 1024QAM, for instance. In other examples, the one constellation may include QPSK, 16QAM, or 64QAM. According to an embodiment, apparatus 10 may be controlled by memory 14 and processor 12 to select a distribution parameter of the constellation depending on one or more flat fading channel(s). When the flat fading channel has been estimated for the constellation, then apparatus 10 may be controlled by memory 14 and processor 12 to select the distribution parameter for the constellation based on the estimated flat fading channel In one embodiment, the distribution parameter may include a Maxwell-Boltzmann (MB) distribution parameter. In one example, the MB distribution may be given by probability masses that are proportional to $\exp(-v*|s|^2)$, where s is a QAM symbol and v is the MB distribution parameter. According to an embodiment, apparatus 10 may be further controlled by memory 14 and processor 12 to transform the uniform distribution of the constellation into a shaped distribution using the selected distribution parameter (e.g., MB distribution parameter) to produce modulated data. In one example, the shaped distribution may include a spherically shaped probability distribution. According to certain embodiments, apparatus 10 may also be controlled by memory 14 and processor 12 to apply a uniform parity, such as +1 or −1, to create a symmetric part of the shaped distribution. In an embodiment, apparatus 10 may then be controlled by memory 14 and processor 12 to pass the modulated data through a fading channel, and to transmit the modulated data to a receiver, which can demodulate the data based on the selected distribution parameter.

Therefore, certain example embodiments provide several technical improvements, enhancements, and/or advantages. For example, certain embodiments provide methods for probabilistic amplitude shaping in the context of narrow-band communication systems, such as 5G systems. Simulation results have demonstrated that the application of example embodiments can measure up to 3 db SNR gain. Further, example embodiments allow for consideration of just one constellation. In addition, given an estimation of the fading channel(s), just the MB parameter v needs to be optimized. As a result, the granularity and flexibility provided by the probabilistic amplitude shaping according to example embodiments outperforms conventional methods. For instance, example embodiments provide results that closely approach the Shannon limit. As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or computer program code or portions of it may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. An apparatus, comprising:
   at least one processor; and
   at least one memory comprising computer program code,
   the at least one memory and computer program code configured, with the at least one processor, to cause the apparatus at least to
   estimate one or more flat fading channels for selecting one constellation,
   select a distribution parameter of the one constellation in a communications system depending on the estimated one or more flat fading channels;
   transform a uniform distribution of the one constellation into a shaped distribution using the selected distribution parameter to produce modulated data; and
   pass the modulated data through a fading channel.

2. The apparatus according to claim 1, wherein the at least one memory and computer program code are further configured, with the at least one processor, to cause the apparatus at least to transmit the modulated data to a receiver.

3. The apparatus according to claim 1, wherein the at least one memory and computer program code are further configured, with the at least one processor, to cause the apparatus at least to apply a uniform parity to create a symmetric part of the shaped distribution.

4. The apparatus according to claim 1, wherein the distribution parameter comprises a Maxwell-Boltzmann (MB) distribution parameter.

5. The apparatus according to claim 4, wherein the Maxwell-Boltzmann (MB) distribution is given by probability masses that are proportional to $\exp(-v*|s|^2)$, where s is a quadrature amplitude modulation (QAM) symbol and $v$ is the Maxwell-Boltzmann (MB) distribution parameter.

6. The apparatus according to claim 1, wherein the shaped distribution comprises a spherically shaped probability distribution.

7. The apparatus according to claim 1, wherein the constellation comprises at least one of 256 quadrature amplitude modulation (QAM) or 1024 quadrature amplitude modulation (QAM).

8. The apparatus according to claim 1, wherein the communications system comprises a 5G system.

9. The apparatus according to claim 1, wherein the apparatus comprises a probabilistic amplitude shaping (PAS) system.

10. A method, comprising:
   estimating one or more flat fading channels for selecting one constellation;
   selecting a distribution parameter of the one constellation in a communications system depending on the estimated one or more flat fading channels;
   transforming a uniform distribution of the one constellation into a shaped distribution using the selected distribution parameter to produce modulated data; and
   passing the modulated data through a fading channel.

11. The method according to claim 10, further comprising transmitting the modulated data to a receiver.

12. The method according to claim 10, further comprising applying a uniform parity to create a symmetric part of the shaped distribution.

13. The method according to claim 10, wherein the distribution parameter comprises a Maxwell-Boltzmann (MB) distribution parameter.

14. The method according to claim 13, wherein the Maxwell-Boltzmann (MB) distribution is given by probability masses that are proportional to $\exp(-v*|s|^2)$, where $s$ is a quadrature amplitude modulation (QAM) symbol and $v$ is the Maxwell-Boltzmann (MB) distribution parameter.

15. The method according to claim 10, wherein the shaped distribution comprises a spherically shaped probability distribution.

16. The method according to claim 10, wherein the constellation comprises at least one of 256 quadrature amplitude modulation (QAM) or 1024 quadrature amplitude modulation (QAM).

17. The method according to claim 10, wherein the communications system comprises a 5G system.

18. A non-transitory computer readable medium comprising program instructions stored thereon for performing at least the following:
   estimating one or more flat fading channels for selecting one constellation;
   selecting a distribution parameter of the one constellation in a communications system depending on the estimated one or more flat fading channels;
   transforming a uniform distribution of the one constellation into a shaped distribution using the selected distribution parameter to produce modulated data; and
   passing the modulated data through a fading channel.

* * * * *